(12) United States Patent
Vorhies

(10) Patent No.: US 9,153,011 B2
(45) Date of Patent: Oct. 6, 2015

(54) MOVEMENT BASED LEVEL OF DETAIL ADJUSTMENTS

(71) Applicant: Google Inc., Mountain View, CA (US)

(72) Inventor: Zachary J. Vorhies, San Francisco, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/707,989

(22) Filed: Dec. 7, 2012

(65) Prior Publication Data

US 2013/0342537 A1 Dec. 26, 2013

Related U.S. Application Data

(60) Provisional application No. 61/663,954, filed on Jun. 25, 2012.

(51) Int. Cl.
| | |
|---|---|
| *G06T 17/00* | (2006.01) |
| *G06G 5/00* | (2006.01) |
| *G06T 5/00* | (2006.01) |
| *G06T 15/04* | (2011.01) |
| *G06T 17/05* | (2011.01) |
| *G06T 19/00* | (2011.01) |

(52) U.S. Cl.
CPC . *G06T 5/00* (2013.01); *G06T 15/04* (2013.01); *G06T 17/05* (2013.01); *G06T 19/003* (2013.01); *G06T 2210/36* (2013.01)

(58) Field of Classification Search
CPC combination set(s) only.
See application file for complete search history.

(56) References Cited

U.S. PATENT DOCUMENTS

| 5,999,187 | A | * | 12/1999 | Dehmlow et al. | 345/420 |
|---|---|---|---|---|---|
| 6,160,559 | A | | 12/2000 | Omtzigt | |
| 2004/0056861 | A1 | | 3/2004 | Huber et al. | |
| 2012/0059720 | A1 | * | 3/2012 | Musabji et al. | 705/14.58 |

FOREIGN PATENT DOCUMENTS

WO WO 2011/069698 6/2011

OTHER PUBLICATIONS

International Search Report (GGL-162-PCT)—2 pages.
Lindstrom et al. "Real-Time, Continuous Level of Detail Rendering of Height Fields", Proceedings of the 23$^{rd}$ Annual Conference on Computer Graphics and Interactive Techniques, Aug. 4-9, 1996, New Orleans, Louisiana, pp. 109-118.

* cited by examiner

*Primary Examiner* — Leon T Cain, II
(74) *Attorney, Agent, or Firm* — Dority & Manning, P.A.

(57) ABSTRACT

Systems and methods for providing movement based level of detail ("LOD") adjustments for textures in a graphics application are disclosed. The method includes displaying, in a user interface of a display device, a plurality of frames representing movement within a geographic area. The geographic area has texture rendered at one or more level of detail, the texture being based at least in part on map, satellite, or geographic imagery. The displayed level of detail of at least a portion of the geographic area is decreased in response to a frame rate of one or more of the plurality of frames and at least one of a ratio of areas of two frames of the plurality of frames, and a ratio of intersecting area of two frames of the plurality of frames to area of one of the two frames.

17 Claims, 6 Drawing Sheets

MOVEMENT BASED LEVEL OF DETAIL ADJUSTMENTS

FIELD

The present disclosure relates generally to computer graphics and more particularly to level of detail adjustments in imaging systems, such as geographic imaging systems.

BACKGROUND

Improvements in computer processing power and broadband technology have led to the development of interactive systems for navigating imagery, such as geographic imagery. Some interactive map navigation systems provide a user interface with navigation controls for navigating cities, neighborhoods, and other terrain in two or three dimensions. The navigation controls enable users to tilt, pan, rotate, zoom, and activate terrain and buildings for different perspectives at an area of interest. Exemplary map imaging systems include the Google Earth and Google Maps systems by Google Inc.

The imagery used by these interactive systems can be derived by rendering geometric objects and texture objects to generate a two-dimensional or three-dimensional graphical representation of an area of interest. The geometric objects can define three-dimensional surfaces of objects and terrain depicted in the imagery. The texture objects can be mapped to the three-dimensional surfaces to add detail, surface texture, color and other features to the depicted objects and terrain.

Interactive systems for displaying imagery, such as geographic imagery, often render geometric and texture objects with low level of detail ("LOD") (e.g. low resolution) at camera views far from an area of interest to improve performance. As the user zooms in the camera view closer to the area of interest, geometric and texture objects with higher LOD (e.g. higher resolution) are rendered to depict objects in greater detail. A user can also control a camera view to navigate between areas of interest that have geometric and texture objects rendered with the same LOD or different LOD. For example, users can "fly" or navigate around a virtual Earth, while geometric and texture objects corresponding to geographical locations are presented in varying LOD.

Ideally, systems are able to render objects fluidly at an optimum frame rate to permit smooth and uninterrupted transition between areas of interest. However, poor system performance due to hardware limitations can result in choppy transitions between areas of interest and jitter or pause as objects are being rendered in response to the desired camera view. The jitter or pause can be a visual anomaly which disrupts the user's sense of immersion in the imagery.

SUMMARY

Aspects and advantages of the invention will be set forth in part in the following description, or may be obvious from the description, or may be learned through practice of the invention.

One exemplary aspect of the present disclosure is directed to a computer-implemented method for rendering texture in a graphics application. The method includes displaying, in a user interface of a display device, a plurality of frames representing movement within a geographic area. The geographic area has texture rendered at one or more level of detail, the texture being based at least in part on map, satellite, or geographic imagery. The displayed level of detail of at least a portion of the geographic area is decreased in response to a frame rate of one or more of the plurality of frames, and at least one of a ratio of areas of two frames of the plurality of frames, and a ratio of intersecting area of two frames of the plurality of frames to area of one of the two frames.

Other exemplary implementations of the present disclosure are directed to systems, apparatus, computer-readable media, devices, and user interfaces for providing smooth level of detail transitions in graphical applications.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
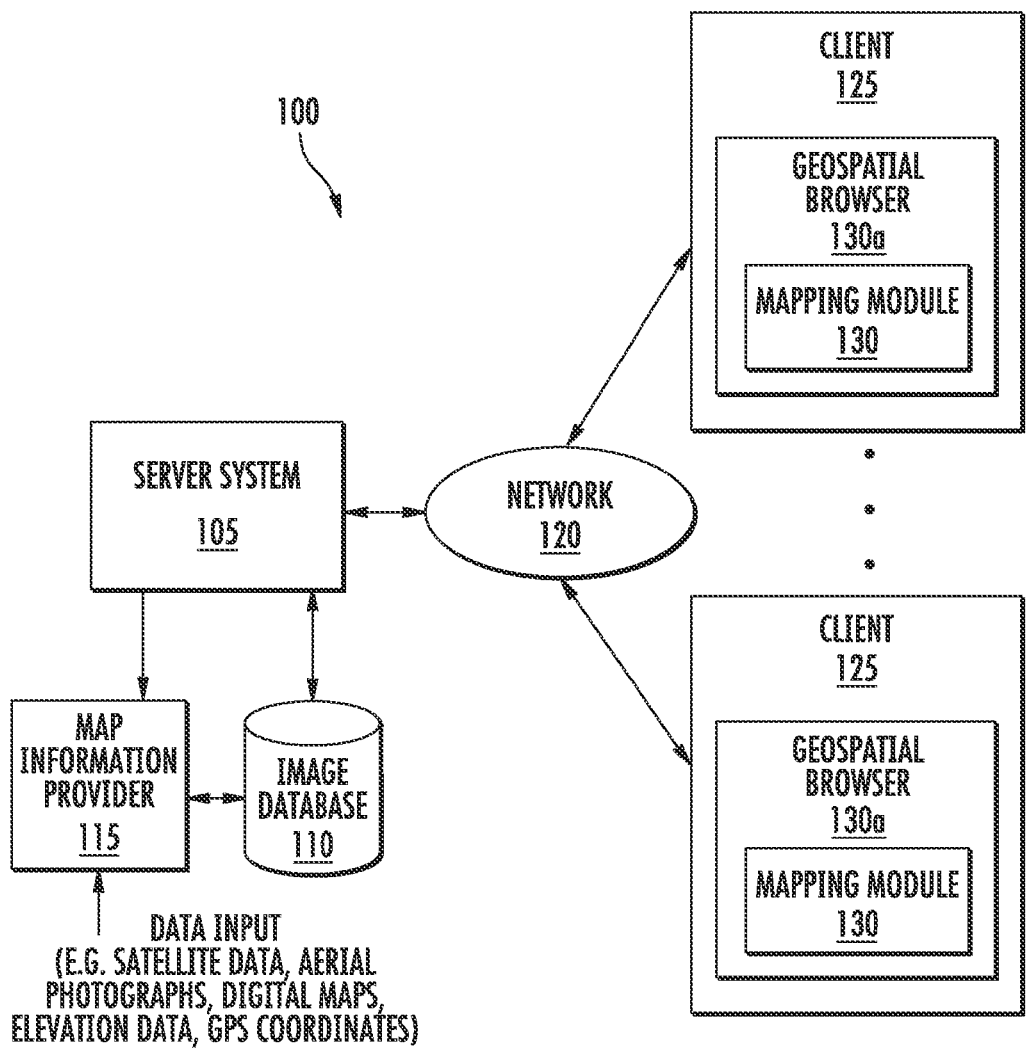
FIG. 1 depicts a computer-based system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for adjusting level of detail ("LOD") for textures in a graphics application. The volume of data to be processed when a camera view is in motion can result in poor rendering performance. Stutter or pause can occur as a user pans or zooms to areas of interest in a graphics application. The present disclosure is directed to decreasing or increasing level of detail in one or more image frames based on frame rate, frame areas, and/or areas of frame intersection. Decreased LOD can allow for improved rendering performance. In certain aspects of the present disclosure, frame LOD can also be increased based on such factors. In this manner, the system is better able to maintain an optimum frame rate resulting in smoother rendering.

In certain implementations, the displayed LOD of a geographic area can be decreased or increased in response to a less than optimum frame rate, which is an indication that the system is unable to suitably render the desired graphics. Frame rate is the number of frames per unit time that are displayed. As used herein, "frame rate" refers to the number of frames of a series of frames which are displayed in a predefined amount of time, or the frequency at which individual frames are displayed. Frame rate is typically measured in units of frames per second (fps). A frame rate of 30 fps can often be high enough that video playback appears smooth to the human eye. However, 20 fps can be considered sufficient for navigating geographic imagery. In many cases, 16-20 fps can also be sufficient for viewing without producing detectable frame transitions. A slower frame rate of 12-15 fps may result in choppy transitions between areas of interest and jitter or pause as objects are being rendered in response to the desired the camera view.

Importantly, when a camera view is not in movement, a substantially lower frame rate that might otherwise be unacceptable can be utilized such as 5 fps or less. As such, the present disclosure can determine camera movement before determining a poor frame rate. Frame rate can be determined by any suitable method and can be expressed as an instantaneous frame rate or an average frame rate over the previous frames.

In certain implementations, a ratio of areas of two frames and/or a ratio of intersecting area of two frames to one of the two frames can also trigger a decrease or increase in LOD. The ratio of areas of two frames in series can be indicative of zooming movement. Similarly, the ratio of intersecting area of two frames to one of the two frames can provide information on panning transition. Predetermined tolerances can be utilized to trigger decreases or increases in LOD.

In this regard, each frame can generally be expressed in spherical coordinates. Such coordinates can be converted to Cartesian space and projected onto a tangent plane in order to determine respective frame areas and the intersecting area of the two frames.

In a particular implementation, frame output quality can be decreased or, after such decrease, increased, to improve performance. Improved performance can reduce the distracting stutter and pause caused by higher resolution imagery. Frame output quality can range from full quality to minimum quality. If frame output quality is at minimum quality, no further decrease in LOD will take place in response to the trigger for decreased performance. Similarly, if frame output quality is at full quality, no further increase in LOD will take place in response to the trigger for increased performance.

Exemplary embodiments of the present disclosure will now be discussed in detail. The present subject matter will be discussed with reference to graphics applications allowing a user to navigate geographic imagery, such as the applications associated with the Google Earth and Google Maps services provided by Google Inc., such as a geographic area that includes a portion of a globe, as well as other 3D and/or 2D imaging systems. Those of ordinary skill in the art, using the disclosures provided herein, should understand that the present disclosure is equally applicable to other suitable graphics applications.

FIG. 1 illustrates an exemplary computer-based system configured in accordance with an embodiment of the present invention. The system combines satellite imagery, photographs, maps and other geographic data, and Internet search capability so as to enable a user to view imagery of the planet (e.g. as a portion of a globe) and related geographic information (e.g., locales such as islands and cities; and points of interest such as local restaurants, hospitals, parks, hotels, and schools). The system further allows the user to conduct local searches, get travel directions to a location or between two locations. The user can virtually fly from space (e.g., some vantage point above the Earth) to and around an entered target address or location, such as his neighborhood or other area of interest. Results are displayed in a 3D view. The user can tilt and rotate the view to see 3D terrain and buildings. The user can also annotate maps, and/or enable data layers to show, for example, parks, schools, hospitals, airports, shopping, and other points of interest or locales. The user can also layer multiple searches, save results to folders, and share search results and maps with others. In addition, a data exchange format referred to herein as KML (Keyhole Markup Language) enables the user to share useful annotations and view thousands of data points created by other system users. An exemplary graphical user interface allowing the user to interact with the system will be discussed with reference to FIG. 2.

Referring to FIG. 1, the system includes a client-server architecture, where the server-side communicates with one or more clients 125 via a network 120. The server-side includes a server system 105, an image database 110, and a map information provider 115. On the client-side, each client 125 includes a mapping module 130 that operates as a geospatial browser 130a (or other suitable viewer), so as to provide the user with an interface to the system. In one embodiment, at least some of the mapping modules 130 of the clients 125 further include development modules that end-users can use to generate data files describing particular presentations of data. In addition, the system may further include one or more third-party content servers.

The server system 105 can be any computing device and can include a processor and memory. The memory can store instructions which cause the processer to perform operations, such as the operations for providing LOD adjustments discussed herein. The server system 105 is in communication with the image database 110, which includes image data (e.g., digital maps, satellite images, aerial photographs, street-level photographs). Non-image data such as tabular data (e.g., digital yellow and white pages), and map layer data (e.g., database of diners, restaurants, museums, and/or schools; databases of seismic activity; database of national monuments; etc.) can also be stored in database 110 or in some other storage facility accessible to server system 105. The database 110 (and others, if applicable) is populated (e.g., offline or in real-time) by the server system 105.

The map information provider 115 provides server system 105 with map information (e.g., satellite data, street-level photographs, aerial photographs, digital maps, elevation data, longitude/latitude data, GPS coordinates). The provided map information can be collected, for example, as a function of the server system 105 (e.g., map information provider 115 is a database of map information collected by the server system 105). Alternatively, or in addition to, various third party map data services can be used to provide map information to server system 105. All such map internal/external information sources are generally represented by map information provider 115.

In any case, the server system 105 receives requests for map information, and responds to those requests, via the network 120. The map information provider 115 can also be further configured to respond directly to user requests for geographic data. In one embodiment, the server system 105 encodes the map information in one or more data files and provides the files to the requestor.

Note that other modules may be included in the system, and that illustrated modules may be rearranged. For instance, the database 110 can be integrated into the server system 105. Also, the map information provider 115 can be integrated into the server system 105. Other configurations will be apparent in light of this disclosure, and the present invention is not intended to be limited to any particular one. Any number of modules can be programmed or otherwise configured to carry out the server-side functionality described herein.

A client 125 on which the mapping module 130 runs can be, for example, a computing device having a processor and memory, such as a desktop or laptop computer. Alternatively, a client 125 can be a wireless device, such as a personal digital assistant (PDA), smart phone, tablet, a navigation system located in a vehicle, a handheld GPS system, or other such devices/systems. In short, the client 125 can be any computer, device, or system that can execute the mapping module 130, and allows the user to interact with the server system 105 (e.g., requesting maps, driving directions, and/or data searches, and then receiving data files in response). In the embodiment shown, the mapping module 130 executes or otherwise runs as a geospatial browser 130a.

The server system 105 can be implemented with conventional or custom technology. Numerous known server architectures and functionalities can be used to implement a GIS server. Further note that the server system 105 may include one or more servers operating under a load balancing scheme, with each server (or a combination of servers) configured to respond to and interact with clients via the network 120.

In general, when the user enters a search query (e.g., via the geospatial browser 130a presented by the client-side mapping module 130), it is put into a request and sent to the server system 105 via the network 120. The server system 105 then determines what the search query is for, and responds with the appropriate data from various sub-systems, such as geo-coders, routing engines, and local search indexes, in a format that the requesting client 125 can use to present the data to the user (e.g., via the geospatial browser 130a).

In addition to any conventional functionality, the server system 105 is further configured to interact with the mapping module 130, as will be apparent in light of this disclosure. In one embodiment, the server system 105 responds to the requesting client 125 by encoding data responsive to the request into one or more data files and providing the files to the client.

The network 120 may be any type of communications network, such as a local area network (e.g., intranet), wide area network (e.g., Internet), or some combination thereof. Alternatively, the network 120 may be a direct connection between a client 125 and the server system 105. In general, communication between the server system 105 and a client 125 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Used in conjunction with the server system 105, the geospatial browser 130a interface provided by the mapping module 130 provides a mapping system that serves maps and data over the network 120. The system allows users to visualize, select, annotate, and explore geographic information all over the world or in a particular region, city, town, or other locale.

Figure 2:
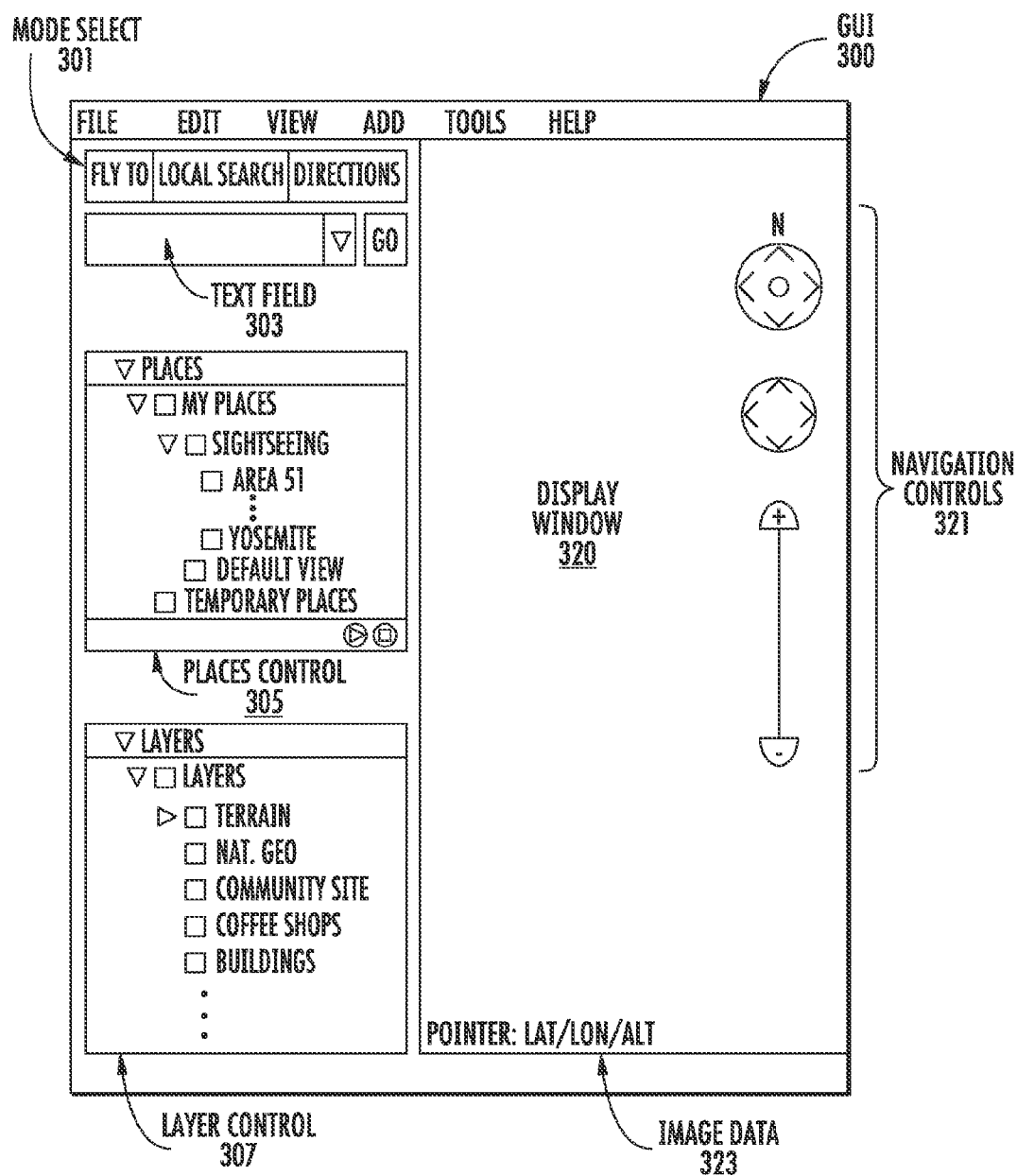
FIG. 2 depicts a graphical user interface for an interactive imaging system according to an exemplary embodiment of the present disclosure.

FIG. 2 illustrates one particular embodiment of a graphical user interface ("GUI") 200, which operates as a geospatial browser 130a for mapping module 130. The GUI includes a display window 321 for displaying 3D imagery, such as a portion of a globe, and a text input field 303 for entering location information such as latitude and longitude, an address and/or zip code, or the name of a well-known site (e.g., "Lincoln Memorial" or "Area 51"). The GUI 200 has a number of modes in which it can operate, including Fly To mode, Local Search mode, and Directions mode, as shown by mode select buttons 301. The GUI 200 also includes navigation controls 321 for adjusting the viewing altitude, adjusting the viewing angle, adjusting the view left and right, and adjusting the view to areas of the 3D imagery to the left, right, top or bottom of the display window.

The GUI 200 also includes places control 305, which allows the user to organize saved data in a Places panel in a way similar to how a user would organize files and folders on a computer's hard drive. The GUI 200 also includes layer control 307, which provides a variety of data points of geographic interest (e.g., points of interest, as well as map, road, terrain, and building data) that a user can select to display over the viewing area. In the embodiment shown in FIG. 2, example commonly used layers are available on the Layers panel. The GUI 200 of this example embodiment also displays image data 323 in the lower portion of the display window 321.

Numerous GUI configurations and underlying functionalities will be apparent in light of this disclosure, and the present invention is not intended to be limited to any one particular configuration. The displayed 3D maps can be manipulated using the GUI 201a. The GUI 200 can be used to reposition the current map view, for example, by selecting and dragging in the display window 321. A user may also select a geographical location by double-clicking (such as by double-tapping in a tablet implementation) on it within the display window 321.

Referring back to FIG. 1, the mapping module 130 associated the client device can include software that operates (in conjunction with server-side software) to provide geographic/geospatial images to a user's computer (or generally, client device) so they can be seen by the user or otherwise processed. In more detail, and in accordance with one particular embodiment, the mapping module 130 includes a user interface module, in which a motion model in the user's client is used to adjust the client's virtual viewing position and orientation relative to the visual environment of the system. The motion model also determines a view specification which defines the client's viewable volume within a three-dimensional space (this viewable volume is known as a frustum and herein referred to as the user's visual environment), and the position and orientation of the frustum, herein referred to as the virtual camera viewpoint, with respect to a three-dimensional map. Once a view specification is determined, it is placed in the memory.

The view specification is read from the memory by a renderer, which is a software tool that draws or "renders" drawable data. The renderer can be configured to repeat a processing cycle, which includes: (1) reading the view specification in memory, (2) traversing a data structure in memory, (e.g. a quad node tree data structure, in which each quad node of the tree contains drawable data), and (3) drawing the drawable data contained in the data structure. The renderer attempts to render the drawable data at a predetermined optimum frame rate. In accordance with the present disclosure, the level of detail of individual rendered output images (or frames) displayed in the graphics application can be decreased or increased to address performance issues. A controller can input multiple signals from the application and output a quality metric signal to renderer which, in turn, adjusts the level of detail of the frame being rendered as is described in more detail as follows.

One exemplary data structure includes a quadtree data structure in which each quad node has a payload of data and references to other files (e.g. four), each of which may be other quad nodes. Although a quadtree data structure is described herein, any suitable data structure can be utilized in connection with the present disclosure. When the renderer traverses the quadtree, it first reads the payload of data in a parent quad node. If the payload is drawable data, the renderer will compare a bounding box (a volume that contains the data) of the payload, if present, to the view specification. If the bounding box is completely disjoint from the view specification, the data will not be drawn, despite the fact that the quad node has already been downloaded from a remote server.

If the payload is considered appropriate to draw, the renderer will attempt to access each of the references of the quad node. If the reference contains an address to a file in local memory, the renderer will go to that child quad node and read the payload, repeating the process for each subsequent child quad node until it encounters a quad node with a payload that has a bounding box completely disjoint from the view specification. If the reference does not contain an address in the local memory (i.e., the referenced file does not exist in the local memory), the renderer cannot access the file, and will continue to move down the quad node tree without trying to obtain the file. In this embodiment, the renderer only reads from the quad node tree, and does not provide coordinate and resolution information to any other object.

The quad node itself can have a built-in accessor function. When the renderer attempts to access a reference that has a filename, but no corresponding local address, this triggers the accessor function of the quad node to independently place its own address and the child reference number onto a cache node retrieval list, which comprises a list of information identifying files to be downloaded from remote servers. A network loader in an independent network loader thread reviews the cache node retrieval list and requests the files referenced on the list.

A cache node manager in an independent cache node manager thread allocates space in local memory and organizes files retrieved by the network loader into new quad nodes. The cache node manager also updates the parent quad nodes with the local memory address of these new child quad nodes. Therefore, on subsequent cycles of the renderer module, there will be additional quad nodes in local memory for the renderer to access. As in previous cycles, the renderer will look at the payload and draw all drawable data that does not fall completely outside the view specification. The renderer thread will continue this cycle until it reaches a quad node with a payload that has a bounding box completely disjoint from the view specification, or is otherwise inappropriate to draw. Thus, the renderer only draws what is already downloaded, and it only stops drawing when it encounters already downloaded data that has a bounding box completely disjoint from the view specification.

The data structure can specify imagery data to be rendered in the form of both geometric objects, such as geometric terrain tiles, and texture objects. Geometric objects can include information used to render three-dimensional objects and terrain in the geospatial view provided at the client device. Texture data can be used to render details, colors, textures, labels, and other features on the surfaces of the three-dimensional objects. The texture objects can be based on digital maps, satellite images, aerial photographs, street-level photographs and other imagery stored at the server. For instance, the geographic terrain of an area of interest can provide the basis for geometric objects for the area of interest while satellite imagery can be used to render texture objects on the surface of the geographic terrain. The data structure can specify other data to be drawn, such as vector data including representations of roads and other features.

Figure 3:
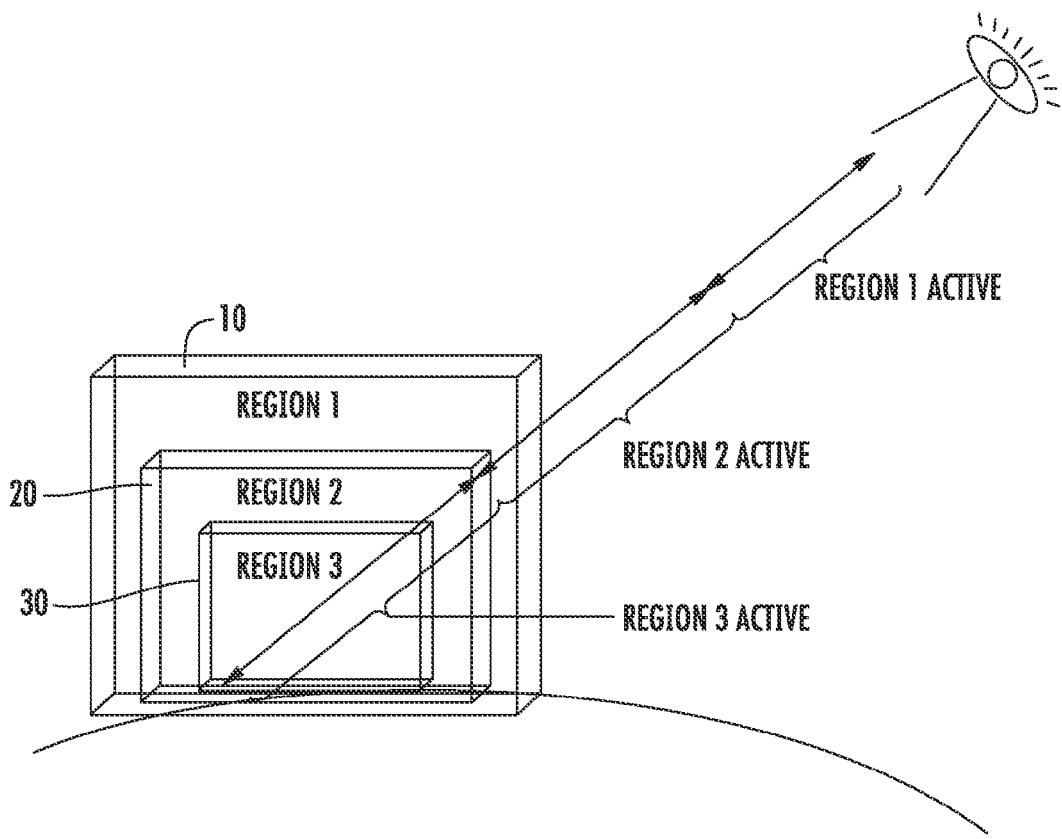
FIG. 3 depicts a conceptual diagram of the use of level of detail in various regions. In particular, region 10 has a higher level of detail than region 20. Region 20 has a higher level of detail than region 30.

The geometric objects, texture objects, and other objects can have varying levels of detail (LOD) based on the user's viewpoint or camera distance relative to the area of interest. For instance, FIG. 3 provides a conceptual illustration of the use of level of detail in differing regions. The regions 10, 20, and 30 in FIG. 3 can be used to specify level of detail specifications associated with data objects, such as texture objects, of increasingly finer levels of detail. The regions can have similar amounts of geometry and texture, but higher level of detail regions can cover a smaller area.

Each region 10, 20, and 30 corresponds to a range of level of detail values that specifying increasingly smaller projected pixel sizes for the drawn objects. The higher level regions are smaller and consequently project to smaller pixel areas on the display for the given viewpoint. As the user's viewpoint (e.g. camera distance) moves closer, the pixel size of the projected level of detail increases, causing regions with large level of detail values denoting higher resolution objects to become active because the data objects take up more screen space. The regions with finer level of detail replace the previously loaded regions with courser resolution and are rendered in the visual environment relative to the virtual camera viewpoint. Accordingly, the geometric objects, such as terrain tiles, and the texture objects can be separated into distinct level of detail levels so that different objects are displayed as the user explores a given area from different camera distances relative to the geographic area.

The level of detail level associated with the geometric objects, such as geometric terrain tiles, for a rendered scene can be specified as a level of detail value, for instance, in the range of 1-20. The higher the level of detail value, the higher the level of detail associated with the object. For instance, an object with a level of detail value of 15 has greater level of detail than an object with a level of detail of 10. While level of detail values in the range between 1-20 are used for discussion purposes, those of ordinary skill in the art, using the disclosures provided herein, should understand that any metric or range of for comparing level of detail between objects can be used without deviating from the scope of the present disclosure.

Figure 4:
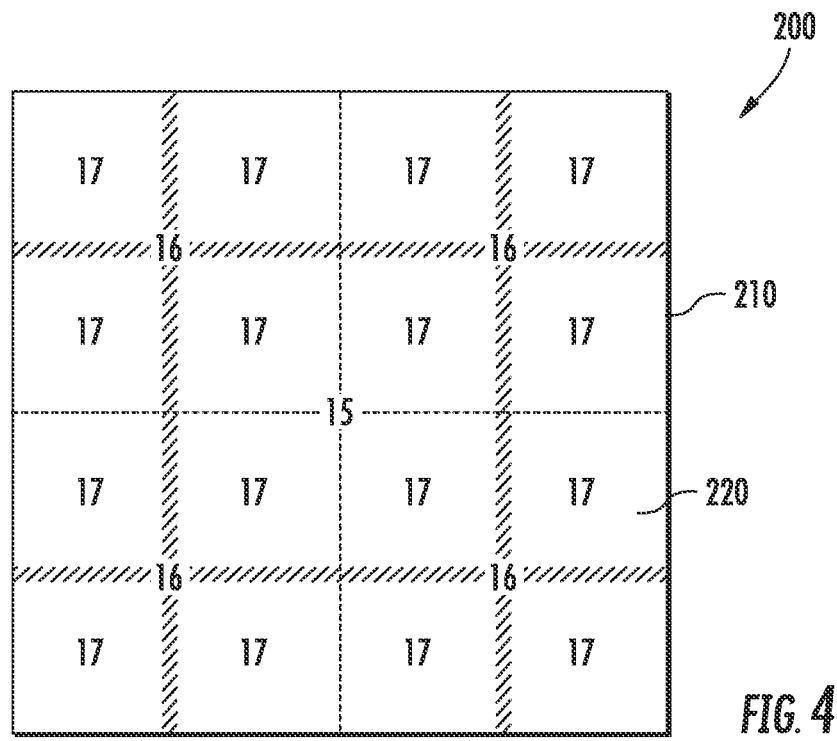
FIG. 4 depicts hierarchy for quadtree geometric terrain tiles according to an exemplary embodiment of the present disclosure.

FIG. 4 depicts a representation showing the logical structure of geometric terrain tiles configured pursuant to a quadtree data structure according to an exemplary embodiment of the present disclosure. Geometric objects associated with the terrain of a geographic area can be provided as geometric terrain tiles configured in a quadtree data structure to facilitate fetching and displaying of only those portions of terrain within the camera view at an appropriate level of detail (i.e. resolution), with higher resolution tiles being depicted at camera distances closer to the geographic area. While the present disclosure is discussed with reference to terrain tiles configured pursuant to a quadtree data structure, those of ordinary skill in the art, using the disclosures provided herein, should understand that the present teachings are equally applicable to other suitable data structures, such as an octree data structure or modified octree data structure.

Figure 5A:
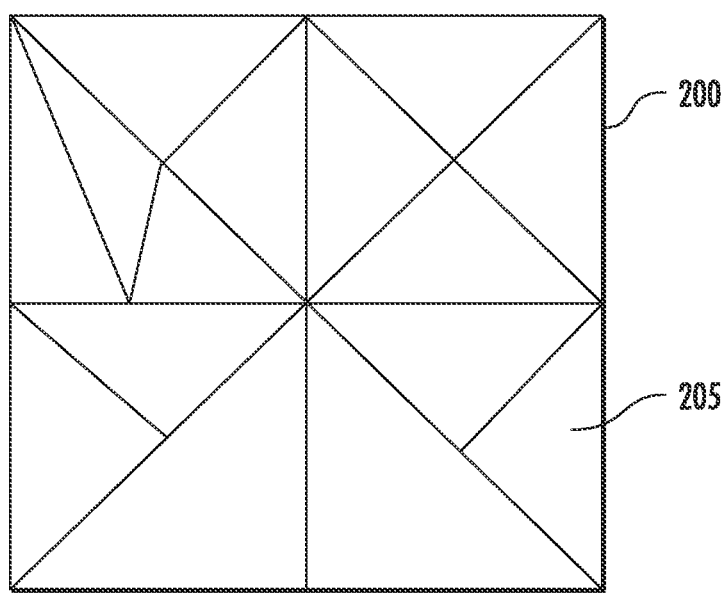
FIGS. 5A-5C illustrate exemplary geometric terrain tiles of varying levels of detail according to an exemplary embodiment of the present disclosure.

As shown in FIG. 4, a first geometric terrain tile 200 associated with a first level of detail, such as level of detail level 15, can be rendered to provide a representation of the terrain of a geographic area. The first geometric terrain tile 200 can be displayed to a user when the camera distance is at a first camera distance associated with the first level of detail. As illustrated in FIG. 5A, the first geometric terrain tile 200 can include a plurality of geometric objects, such as mesh triangles 205, that are used to model the terrain of the geographic area.

Figure 5B:
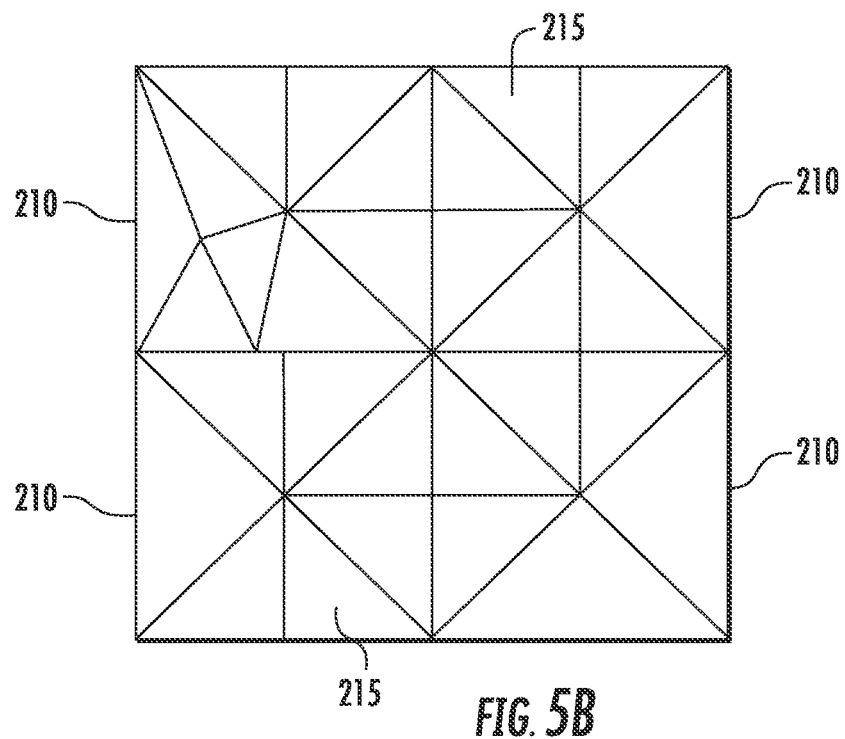

Referring back to FIG. 4, the first geometric terrain tile 200 can be part of a payload of a quad node in a quadtree data structure with links to four child geometric tiles, namely second geometric tiles 210. Second geometric tiles 210 can be associated with a second level of detail, such as level of detail level 16, which is higher than the first level of detail. As shown in FIG. 5B, the second geometric terrain tiles 210 can also include a plurality of geometric objects, such as mesh triangles 215, that are used to model the terrain of the geographic area. The number of mesh triangles 215 associated with the four second geometric terrain tiles 210 is greater than the number of mesh triangles 205 associated with the first geometric tile 200, providing higher resolution terrain imagery in the representation of the geographic area.

Referring back to FIG. 4, the second geometric terrain tiles 210 covers roughly one fourth of the geographic area as the first geometric terrain tile 200. As the camera distance transitions from a first camera distance associated with the first level of detail to the second camera distance associated with the second level of detail, the quadtree data structure can be traversed such that the second geometric terrain tiles 210 replace the first geometric terrain tile 200 in the representation of the geographic area. In this manner, geometric terrain tiles associated with higher levels of detail can be displayed as the camera distance moves closer to the geographic area.

Figure 5C:
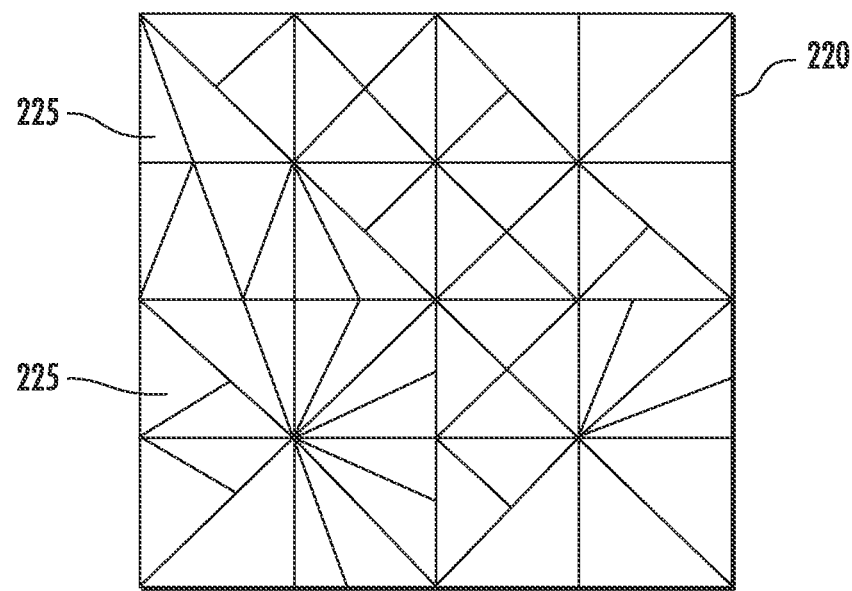

The second geometric terrain tiles 210 can also be payloads of quad nodes in a quadtree data structure. Each of these quad nodes can include links to four child geometric tiles, namely third geometric terrain tiles 220. Third geometric terrain tiles 220 can be associated with a third level of detail, such as level of detail level 17, which is higher than the first and second levels of detail. As shown in FIG. 5C, the third geometric terrain tiles 220 can also include a plurality of geometric objects, such as mesh triangles 225, that are used to model the terrain of the geographic area. The number of mesh triangles 225 associated with the third geometric terrain tiles 220 is greater than the number of mesh triangles 205 associated with the first geometric tile 200 and the number of mesh triangles 215 associated with the second geometric tiles 200, providing even higher resolution terrain imagery in the representation of the geographic area.

The third geometric terrain tiles 220 cover roughly one fourth of the geographic area as the second geometric terrain tile 210, and one sixteenth of the geographic area as the first geometric terrain tile 200. As the camera transitions to a third camera distance associated with the third level of detail, the quadtree data structure can be traversed such that the third geometric terrain tiles 220 replace the geometric terrain tiles associated with lower levels of detail in the representation of the geographic area.

The movement from lower level of detail geometric terrain tiles to higher level of detail geometric terrain tiles can cause a distracting stutter or pause during navigation of the geographic area due to processing limitations. Indeed, movement between tiles of identical level of detail can also cause stutter or pause. To reduce such performance issues, aspects of the present disclosure include decreasing levels of detail of frames based on frame rate, frame areas, and/or areas of frame intersection. In this manner, smoother movement between frames of geometric terrain tiles in a graphics application can be provided.

Figure 6:
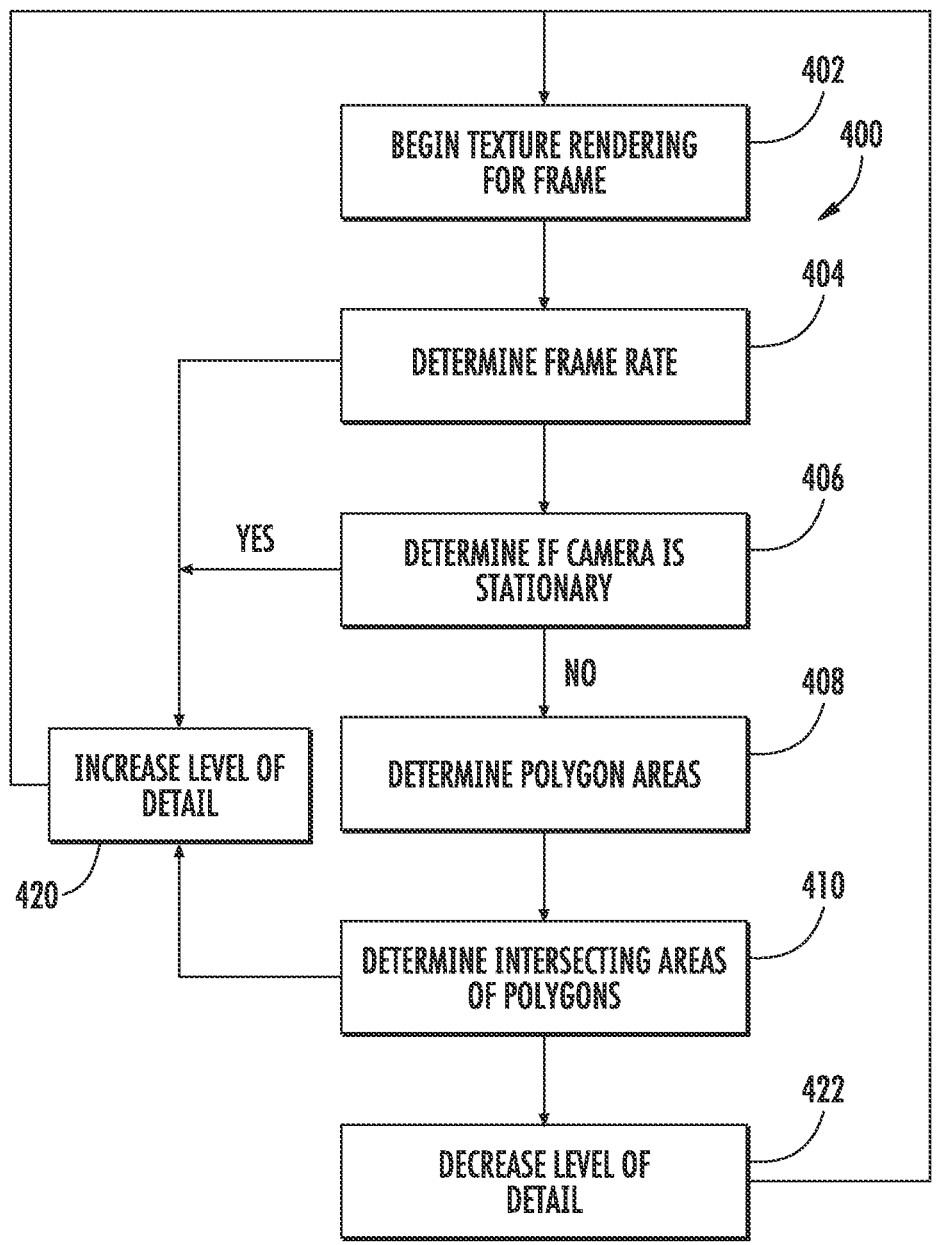
FIG. 6 depicts a flow diagram of an exemplary computer-implemented method of providing level of detail adjustments according to an exemplary embodiment of the present disclosure.

FIG. 6 depicts an exemplary flow diagram of a computer-implemented method (400) for providing level of detail adjustments in a graphics application according to an exemplary embodiment of the present disclosure. The method (400) can be implemented using any suitable computing device, such as the mapping module 130 of FIG. 1. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At (402), the method begins texture rendering for the next frame by viewing the current frame and the preceding frame. A frame refers to an individual rendered output image displayed in the graphics application. In accordance with aspects of the present disclosure, the steps of the method can be performed during the rendering of each new frame to allow for LOD adjustment between frames.

At (404), the method determines the frame rate of the application. As discussed previously, frame rate can be determined by any suitable method and can be expressed as an instantaneous frame rate or an average frame rate over the previous frames. For instance, in certain exemplary embodiments of the present disclosure, a median frame rate over the previous 5 frames can be computed by the method. Suitable frame rate values can vary based on the desired level of performance.

If the frame rate is acceptable, the method can signal high quality which will indicate to renderer to increase level of detail unless already at full quality. The method completes the texture rendering for the next frame (420).

Otherwise, the method continues to (406) where the method determines if the camera is stationary or in movement. Camera movement can be determined by a software signal as would be understood in the art or can be determined based on the polygon areas of two frames, the current frame and the preceding frame, as will be described in more detail.

If the camera is stationary the method can signal high quality and complete texture rendering for the next frame (420). As discussed previously, even though the frame rate is not acceptable, because the camera is stationary a much lower frame rate can be tolerated.

If the camera is not stationary, the method can move to (408) where the polygon areas of the current frame and preceding frame are determined Optionally, the method can bypass (408) and move directly to adjust level of detail of the next frame (422). In other alternative implementations, the method can begin at (408). In still other alternative implementations, the method can bypass (406) and decrease the level of detail of the next frame (422) based only upon the frame rate determined at (404). If the level of detail is already at minimum quality, that level of detail can be maintained. However, such an approach does not take into account camera movement so frame rate below the acceptable value will still cause a decrease to the level of detail, even though the camera position is stationary.

Referring to (408), the polygon areas of the current frame and preceding frame are determined. The information for the previous frame can be retrieved from memory. The bounding box representing the frames are in spherical coordinates and can be converted to Cartesian space and then projected onto a two dimensional Cartesian tangent plane.

For instance, vp1 represents the current frame and vp0 represents the previous frame polygon. As the viewing frames are in spherical coordinates, both vp0 and vp1 are converted to Cartesian space. Next, the centroid of vp0 and vp1 is calculated:

a) Assume both view-polys vp0 and vp1 are made of 4 points. The four points for vp0 can be denoted as vp0[0], vp0[1], vp0[2], vp0[3]

b) The centroids for each polygon, c0 and c1, are defined as the average point of the polygon points:
    b1) c0=(vp0[0]+vp0[1]+vp0[2]+vp0[3])/4
    b2) c1=(vp1[0]+vp1[1]+vp1[2]+vp1[3])/4 c) The centroid for the tangent plane would then be average of these two centroids:
    c1) centroid=(c0+c1)/2

In order to calculate the tangent plane, MakePlane(position, direction) can be utilized as a function that returns a plane. The tangent plane can be defined as:
tangent_plane=MakePlane(centroid, NormalizedVector(centroid)/*direction*/);

Because vp0 and vp1 are in Cartesian space, and the tangent_plane is also in Cartesian space, projecting a Cartesian xyz point onto the tangent_plane will produce a two-dimensional point on that plane:

a) Let Project2D(tangent_plane, points[ ]) be a function which takes in a collection of points and a plane and returns a copy of those points projected onto the plane.

b) Let proj_vp0 and proj_vp1 be the viewpolygons that are projected onto the tangent_plane.

c) proj_vp0=Project2D(tangent_plane, vp0)

d) proj_vp1=Project2D(tangent_plane, vp1)

From the two-dimensional polygon, the area of each frame can be determined:

a) area_proj_vp0=PolygonArea(proj_vp0);

b) area_proj_vp1=PolygonArea(proj_vp1);

A ratio of polygon areas can be utilized to determine if the camera view is moving or changing. For instance, if the ratio is 1.0, the two polygon areas of the frames are 100% identical so the camera is stationary. In the alternative, if the ratio is 0.0, 0% of the polygon areas of the frames are identical so the current frame is significantly different from the previous frame.

A value between 0 and 1 can represent the percentage that the viewpolygons of the frame are changing, such that 1.0=100% same and 0.0=0% same. Notice that if a simple ratio is taken (e.g. area_proj_vp0/area_proj_vp1) then a suitable number is only generated when the numerator is smaller than denominator, for example 5.0/10.0=0.5. However, the ratio needs to be consistent even when the numerator is larger than the denominator, i.e., 10.0/5.0=2.0!=0.5.

This can be addressed by forcing the numerator to always be smaller than the denominator by swapping values:
Min(10.0, 5.0)/Max(10.0, 5.0) provides the needed symmetry.

Therefore:
a) Sameness(val1, val2):=return Min(val1, val2)/Max(val1, val2)
    a1) Sameness(25, 25)=1.0
    a2) Sameness(5, 10)=0.5
    a3) Sameness(10, 5)=0.5

Referring again to (408), as both areas of both polygon view frames can be calculated, a determination can be made as to whether the view has changed significantly. If it is determined that the view has not changed significantly, the method can move to (410). Optionally, the method can bypass (410) and complete texture rendering for the next frame (420) at high quality, although the low frame rate condition will likely persist. If it is determined that the view has changed significantly, the method can move to (410). Alternatively, the method can bypass (410) and move directly to decrease the level of detail of the next frame (422).

At (410) intersecting area of the polygons of the current frame and previous frame can be determined. From the two-dimensional polygons, intersecting area can be determined:
intersecting_area=IntersectPolygonArea(proj_vp0, proj_vp1);

If it is determined that the intersection of the current frame and previous frame is low, the method can move to directly to decrease the level of detail of the next frame (422). If the intersection is high, the method can complete texture rendering for the next frame (420) and signal high quality to the renderer, although the low frame rate condition will likely persist.

In practice, steps (406), (408), and (410) can be used in combination. In particular, if a low frame rate condition is detected, the method can utilize steps (408) and (410) to attempt to remedy the condition. A tunable value can be selected that gives appropriate tolerance for camera movements, such as small camera movements:

a) zoom_diff=1.0−Sameness(area_proj_vp0, area_proj_vp1)/*zoom_diff is 0 . . . 1*/ b) intersecting_area_diff=1.0−Sameness(intersecting_area, Max(area_proj_vp0, area_proj_vp1))

c) if (zoom_diff>zoom_diff_threshold) return LowQuality d) otherwise: if (intersecting_area_diff<intersecting_area_diff_threshold) return LowQuality For example, a large amount of pan, with little zoom can be reflected as follows:
let zoom_diff=0.05 (5% difference in zoom),
zoom_diff_threshold=0.06 (6% difference before "LowQuality")
intersecting_area_diff=0.10 (10% of the area was NOT intersecting)
intersecting_area_diff_threshold=0.05 (5% difference before "LowQuality")
Zoom Test fails: (zoom>zoom_diff_threshold) as (0.05>0.06) is FALSE
Pan Test succeeds: (intersecting_area_diff>intersecting_area_diff) as (0.10>0.05) is TRUE.

Regardless of the outcome, the process can begin again at step (402) upon generation of the next frame. In this manner, the texture LOD adjustment provides for fluid movement between the frames to prevent the jitter and pause caused by higher resolution imagery into view.

Depending on the signal generated, quality can be incremented or decremented until full quality or minimum quality are reached.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for rendering texture in a graphics application, comprising:
    displaying, with one or more computing devices, in a user interface of a display device, a plurality of frames representing movement within a geographic area, the geographic area having texture rendered at one or more level of detail, the texture being based at least in part on map, satellite, or geographic imagery; and decreasing, with the one or more computing devices, the displayed level of detail of at least a portion of the geographic area in response to a frame rate of one or more of the plurality of frames and at least one of a ratio of areas of two frames of the plurality of frames, and a ratio of intersecting area of two frames of the plurality of frames to area of one of the two frames, wherein determining the ratio of intersecting area of two frames of the plurality of frames to area of one of the two frames comprises calculating the intersecting area of the two frames;

wherein determining the ratio of areas of the two frames comprises calculating a polygon area for each of the two frames and dividing one of the polygon areas by the other polygon area, the numerator of the division being the smaller of the two areas when the two areas are not equal.

2. The computer-implemented method of claim 1, wherein the ratio of intersecting area of two frames of the plurality of frames to area of one of the two frames is determined by calculating a polygon area for each of the two frames, calculating the intersecting area of the two frames, and dividing the intersecting area by the larger of the two polygon areas.

3. The computer-implemented method of claim 1, further comprising:

adjusting the displayed level of detail of at least a portion of the geographic area in response to a frame rate of one or more of the plurality of frames, a second ratio of areas of two frames of the plurality of frames, a second ratio of intersecting area of two frames of the plurality of frames to area of one of the two frames, or combinations thereof.

4. The computer-implemented method of claim 3, wherein at least one of the two frames of the second ratio of areas is different from the two frames of the ratio of areas.

5. The computer-implemented method of claim 3, wherein at least one of the two frames of the second ratio of intersecting area is different from the two frames of the ratio of intersecting area.

6. The computer-implemented method of claim 3, wherein the displayed level of detail is adjusted by decreasing the displayed level of detail.

7. The computer-implemented method of claim 3, wherein the displayed level of detail is adjusted by increasing the displayed level of detail.

8. A computing system, comprising:

a display device;

one or more memory devices; and one or more processors, the processors storing computer-readable instructions that when executed by the one or more processors cause the one or more processors to perform operations, the operations comprising:

displaying a plurality of frames representing movement within a geographic area, the geographic area having geometric objects defining surfaces in the geographic area and texture rendered on the surfaces defined by the geometric objects, the texture being rendered at a level of detail; and decreasing the displayed level of detail of at least a portion of the geographic area in response to a frame rate of one or more of the plurality of frames, and at least one of a ratio of areas of two frames of the plurality of frames, and a ratio of intersecting area of two frames of the plurality of frames to area of one of the two frames, wherein determining the ratio of intersecting area of two frames of the plurality of frames to area of one of the two frames comprises calculating the intersecting area of the two frames;

wherein determining the ratio of areas of the two frames comprises calculating a polygon area for each of the two frames and dividing one of the polygon areas by the other polygon area, the numerator of the division being the smaller of the two areas when the two areas are not equal.

9. The computing system of claim 8, wherein operations performed by the processing circuitry to calculate the ratio of intersecting area of two frames of the plurality of frames to area of one of the two frames comprise:

calculating a polygon area for each of the two frames;

calculating the intersecting area of the two frames; and dividing the intersecting area by the larger of the two polygon areas.

10. The computing system of claim 8, wherein operations performed by the processing circuitry adjust the displayed level of detail of at least a portion of the geographic area in response to a frame rate of one or more of the plurality of frames, a second ratio of areas of two frames of the plurality of frames, a second ratio of intersecting area of two frames of the plurality of frames to area of one of the two frames, or combinations thereof.

11. The computing system of claim 8, wherein the first computing device is configured to receive the texture for the representation of the geographic area from a second computing device over a network.

12. A computer-implemented method for rendering texture in a graphics application, comprising:

identifying, with one or more computing devices, a series of frames of a graphics application, the series of frames having texture rendered at one or more level of detail; and initiating, with the one or more computing devices, a decrease in the level of detail of at least one frame;

wherein the decrease in the level of detail is in response to a frame rate of one or more of the series of frames, and at least one of a ratio of areas of two frames of the series of frames, and a ratio of intersecting area of two frames of the series of frames to area of the two frames, wherein determining the ratio of intersecting area of two frames of the plurality of frames to area of one of the two frames comprises calculating the intersecting area of the two frames;

wherein determining the ratio of areas of the two frames comprises calculating a polygon area for each of the two frames and dividing one of the polygon areas by the other polygon area, the numerator of the division being the smaller of the two areas when the two areas are not equal.

13. The computer-implemented method of claim 12, wherein the ratio of intersecting area of two frames of the plurality of frames to area of one of the two frames is determined by calculating a polygon area for each of the two frames, calculating the intersecting area of the two frames, and dividing the intersecting area by the larger of the two polygon areas.

14. The computer-implemented method of claim 12, further comprising:

adjusting the level of detail of at least one frame in response to a frame rate of one or more of the series of frames, a second ratio of areas of two frames of the series of frames, a second ratio of intersecting area of two frames of the series of frames to area of one of the two frames, or combinations thereof.

15. The computer-implemented method of claim 14, wherein at least one of the two frames of the second ratio of areas is different from the two frames of the ratio of areas.

16. The computer-implemented method of claim 14, wherein at least one of the two frames of the second ratio of intersecting area is different from the two frames of the ratio of intersecting area.

17. The computer-implemented method of claim 14, wherein the level of detail is adjusted by decreasing the level of detail.

\* \* \* \* \*